United States Patent Office.

IMPROVEMENT IN THE MANUFACTURE OF WHITE LEAD.

THOMAS M. AND AMBROSE G. FELL, OF BROOKLYN, NEW YORK, ASSIGNORS TO THEMSELVES AND WILLIAM BELL, OF NEW YORK CITY.

*Letters Patent No. 59,902, dated November 20, 1866.*

SPECIFICATION.

TO ALL WHOM IT MAY CONCERN:

Be it known that we, THOMAS M. FELL and AMBROSE G. FELL, both of the city of Brooklyn, in the county of Kings, and State of New York, have invented certain new and useful improvements in the Manufacture of White Lead, and do hereby declare that the following is a full, clear, and exact description thereof.

Our present improvements consist in the production and treatment of a new precipitate of lead, to be used for the ordinary purposes to which white lead is applied. The great objection heretofore to precipitated salts of lead has been by reason of the crystalline structure of the particles, which was caused by the large percentage of acid and water that was absorbed and held in combination. The resulting non-opacity destroys the property known as body, or, in other words, prevents the after formation of an oleate of lead. It is immaterial what kind of simple precipitant is used to precipitate lead from its solutions, whether sulphuric, muriatic, carbonic, or other acids, the effect is the same; that is, they all produce a crystalline precipitate, which requires a very extensive after treatment with alkalies before it can be used as a paint or white lead, while our new process produces a precipitate opaque, or product free of crystals, much finer grained and whiter than any heretofore obtained, and which in its after treatment effects a great saving in the use of alkali.

Lead ore, metallic lead, oxide of lead or litharge, or substances containing lead, may be easily treated to produce a soluble salt of lead either by nitric acid, acetic acid, or other solvents of lead; to which solvents we make no claim, as the same, as well as the manner of producing solutions of lead, are well known and practised in various arts and manufactures; but having obtained a solution of lead by any cheap and expeditious manner, (we preferring a solution derived by the use of nitric acid in suitable vessels,) instead of precipitating it by sulphuric acid, the usual method, we proceed as follows: we prepare a precipitant, termed by us a chloro-sulphuric, by intimately mixing about ten parts of muriatic (hydro-chloric) acid of 18° with ninety parts of sulphuric acid of 60°, adding more or less water. This prepared precipitant is then gradually introduced into the solution of lead contained in vessels capable of resisting the action of acids, such as closely rolled lead-lined tanks, or glass or rubber, and the whole is well agitated by any suitable means adapted for continual stirring. Sulphuric acid, when used separately, produces a very crystalline white lead; such is also the case with respect to muriatic acid, the latter acid, under such a condition, imparting to the lead an impure color, while the combination of these two acids gives a brilliant and opaque white lead, free of crystals and much whiter than is obtained by the use of either acid alone. We call our precipitate a basic chloro-sulphate, which requires only a very short process to render the same superior to the white lead now in use in respect to body, color, and the property of forming an oleate with oil.

Having obtained our precipitate, it is next well washed with water, pressed partly dry by a hydraulic press, and treated with about one per cent. of either potash or soda alkali contained in another vessel, where it is subjected to heat for from three to four hours; then being allowed to cool off and settle down, it is well washed, in order to remove any free alkali, and again subjected to the action of the hydraulic press, for the purpose of solidifying the mass, which facilitates handling, and afterwards dried on pans in warm chambers, which completes it for market.

Whatever solvent is used, (we prefer one part nitric acid, of the strength of 36° Baume, to three parts of water,) after precipitation of the lead by the hydro-sulphuric such solvent is liberated for further use. We have given the proportions as ten parts of muriatic acid, or hydrochloric, to ninety parts of sulphuric acid, but these may be varied, producing substantially similar results, although we find such proportions to be, so far, the best in practice. It is also immaterial as to the kind of alkali used, whether it be caustic soda, potash, or lime, or any alkaline compound, though we prefer at the present time to use a solution of potash or soda, as previously spoken of.

The constitution of this precipitate may also be changed into a carbonate of lead, in the manner stated in our patent dated September 25, 1866, and finally treated with the alkali solution. Also that an alkaline effect on it may be produced by the direct use of an alkaline compound, as stated in said patent, with respect to the sulphate obtained as therein referred to. This precipitate may also be produced by the manipulation described in said patent for obtaining the sulphate, substituting what we term chloro-sulphuric acid, in the place of the sulphuric.

We claim herein, as our invention, as follows:

1. The treatment of a solution of lead with a combination of acids, in the manner and for the purposes substantially as described.

2. The production of a basic chloro-sulphate, either by separate or complete solution and precipitation, or by treatment in one and the same vessel, in the manner and for purposes substantially as described, 3. The treatment of a precipitate so produced with an alkali solution, in the manner and for the purpose substantially as described.

4. The treatment of a precipitate so produced with the carbonate of either potash, soda, or lime, followed by an alkali solution, in the manner and for the purpose substantially as described.

5. The treatment of a precipitate so produced with any alkaline compound, in the manner and for the purpose substantially as described, 6. The manufacture of white lead from the ores of lead, metallic lead, oxide of lead or litharge, or other substance containing lead, either by separate or complete solution and precipitation, or by treatment in one and the same vessel of a salt of lead with a double precipitant, in combination with an alkali solution, either with or without the prior treatment by an alkaline compound, substantially as described.

THOMAS M. FELL,
AMBROSE G. FELL.

Witnesses:
WM. F. McNAMARA,
JOHN McINTYRE.